INVENTORS
MAX D. McHENRY
RICHARD E. PARKS
BY
Graybeal, Cole & Barnard
ATTORNEYS

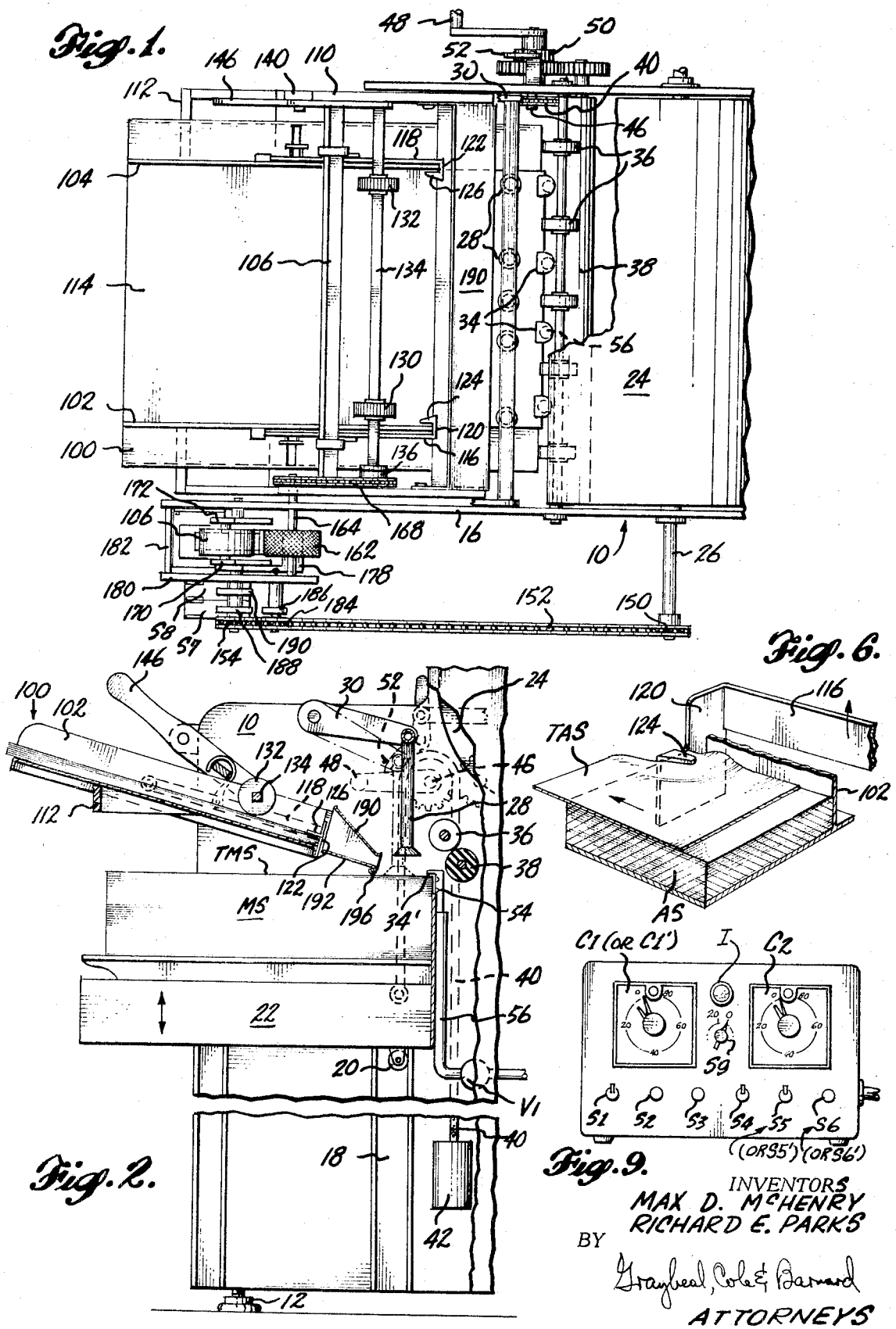

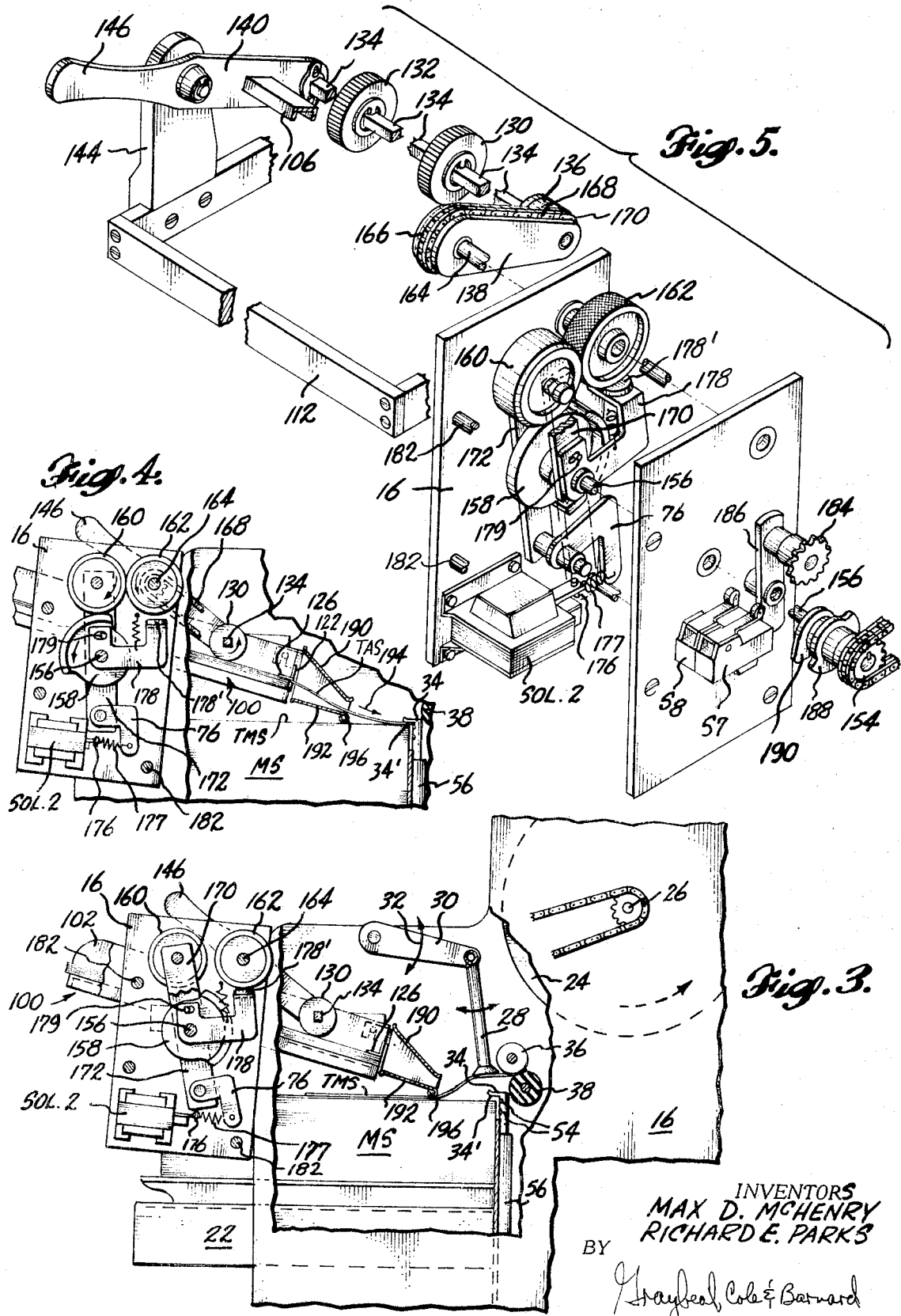

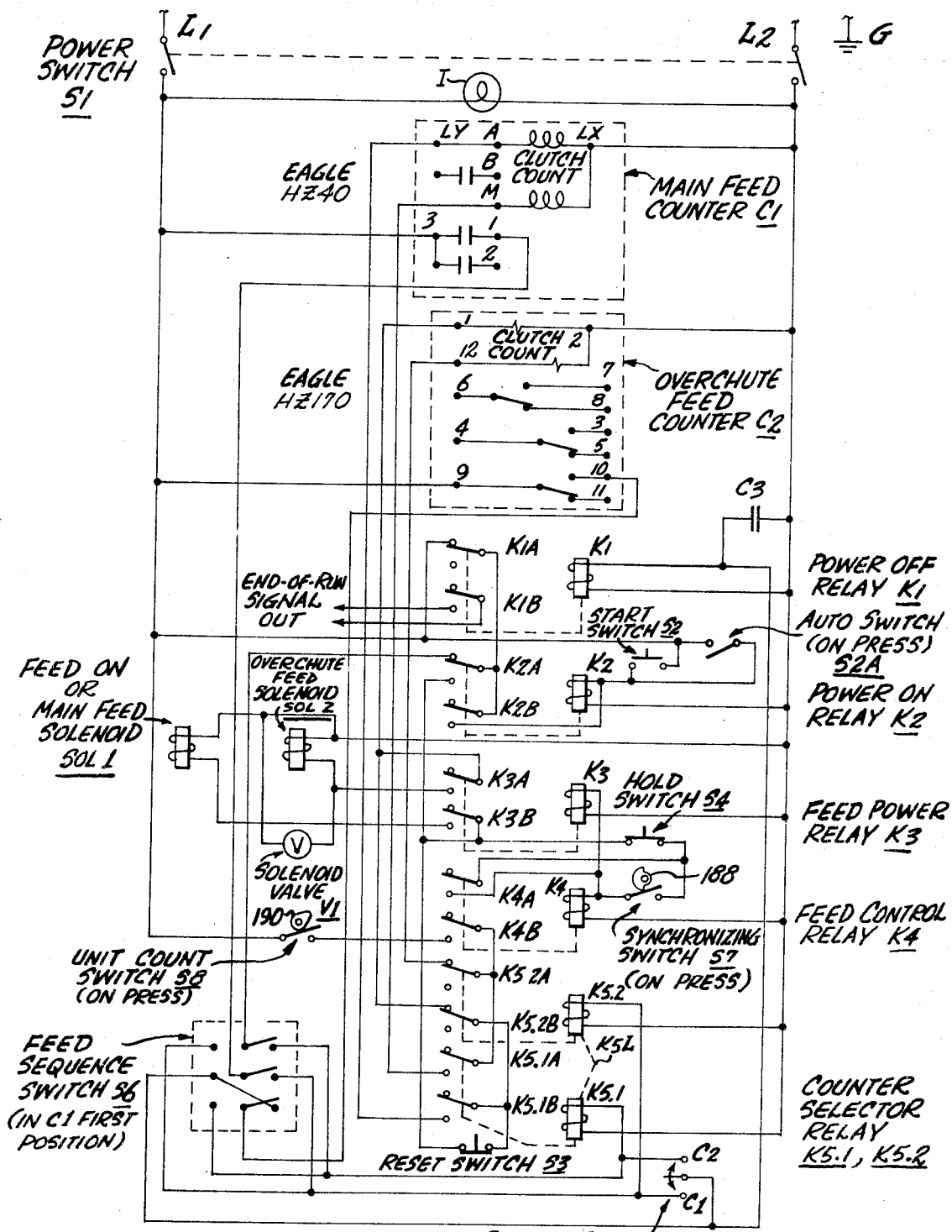

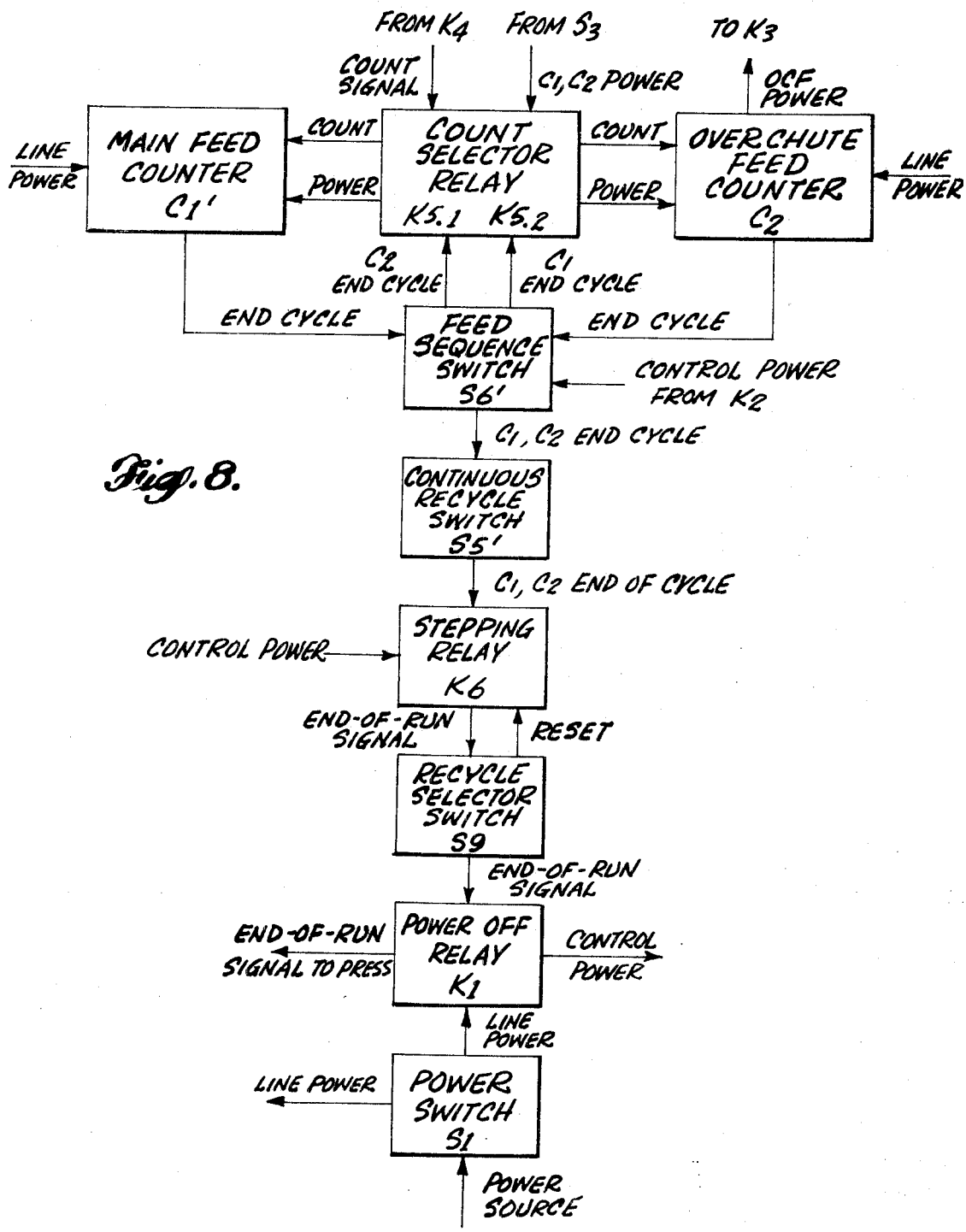

United States Patent Office 3,512,479
Patented May 19, 1970

3,512,479
AUTOMATED OVERCHUTE FEED MECHANISM FOR A PRINTING PRESS AND CONTROL SYSTEMS THEREFOR
Max D. McHenry, Enumclaw, and Richard E. Parks, Seattle, Wash., assignors, by mesne assignments, to Amadyne, Inc., Seattle, Wash., a corporation of Washington
Filed Oct. 31, 1967, Ser. No. 679,376
Int. Cl. B65h *3/44*
U.S. Cl. 101—232        31 Claims

ABSTRACT OF THE DISCLOSURE

Overchute feed mechanism for use in conjunction with offset duplicator type paper printing equipment and the like, characterized by automated activation of either the main paper feeding mechanism or the overchute paper feeding mechanism in selected sequence, for a predetermined sheet count per sequencing cycle, and for a predetermined number of cycles per printing run. The automated counting, sequencing and recycling control of the printer and respective feed mechanisms is accomplished by preset sheet counters for each feed mode, feed sequence selection means, and in one form of the invention a preset recycle control means. Also provided are hold or interrupt control means, single feed mode selection means, automatic synchronization of the feed means with the duplicator, and end-of-run signal output means. The overchute feed mechanism is characterized by utilization of a single vacuum type sheet pickup means for both main sheet feed and overchute sheet feed, and by friction feed of the overchute sheets, actuated by an interruptable drive training under control of solenoid means maintained under steady state energization during a given overchute feed sequence.

BACKGROUND OF THE INVENTION

Field of the invention

This invention relates to overchute feeder mechanisms and automated control systems therefor, of the type employed as accessory equipment with offset duplicator paper printing mechanism and the like.

Description of the prior art

The basic types of offset duplicator printing equipments to which the present invention is applicable are exemplified by the equipment disclosed in Curtis U.S. Pat. No. 2,293,046 and Curtis U.S. Pat. No. 2,358,560, and by A. B. Dick Company Offset Duplicator Models 350, 360, 367A and 369. When it is desired to collate, interleave, or otherwise print and combine sheets of a different type with the sheets of a given type being run through such an equipment, it has long been conventional practice to provide a simple overchute feeder tray for a stack of the different sheets, with the auxiliary sheets being fed from the overchute stack manually as desired. Typical mechanism for manual overchute feed is shown in Janke U.S. Pat. No. 2,492,577.

Also known is the type of overchute feed mechanism disclosed in Keil U.S. Pat. No. 3,033,110, which involves a supplemental sheet feeder including an auxiliary feed tray, from which sheets are power fed in lieu of sheet feed from a main feed tray upon manual rocking movement of the auxiliary feed tray, the rocking movement of the tray against its spring loading closing limit switch means to energize the auxiliary sheet feed drive.

Gericke U.S. Pat. No. 3,153,535 discloses another form of power type auxiliary paper sheet feeder wherein auxiliary feed is accomplished by manually controlled lever means effecting forward movement of the entire auxiliary feed mechanism.

Also known is an overchute paper feeding mechanism marketed by Fairchild-Davidson in which the auxiliary sheets are "fanned" (i.e. the leading edges of the sheets are progressively offset in the direction of feed) so that the sheets are picked up one at a time in the nip between stone and rubber feed rollers, the rubber feed roller being rotatively driven through an arc of travel by each stroke of an actuating solenoid. In contrast, the overchute feeder mechanism of the present invention involves single, steady state actuation of an overchute feed solenoid during the entire overchute feeding sequence, rather than actuation of the solenoid for each overchute sheet fed. In addition, the Fairchild-Davidson overchute feeder disables the main sheet vacuum cup pickup assembly during overchute sheet feeding, employing an entirely separate feed mechanism for overchute feeding, whereas the overchute feeder of the present invention utilizes the same vacuum pickup system for feeding sheets from both the main stack and the auxiliary or overchute stacks.

Another known mechanism for overchute sheet feeding to a duplicator type printer is the Addressograph-Multigraph so-called inserter mechanism wherein auxiliary sheet transfer is entirely by vacuum pickup means, moving along a horizontal bed, and without friction feed type paper handling.

SUMMARY OF THE INVENTION

The present invention provides for overchute feed mechanism with offset duplicator type paper printing equipment and the like, characterized by automated activation of the main paper feeding mechanism and the overchute paper feeding mechanism in selected sequence, for a predetermined sheet count per sequencing cycle, and for a predetermined number of cycles per printing run. The automated counting, sequencing and recycling control of the printer and respective feed mechanisms is accomplished by preset sheet counters for each feed mode, feed sequence selection means, and one form of the invention also incorporates preset recycle control means. Also provided are hold or interrupt control means, single feed mode selection means, automatic synchronization of the feed means with the duplicator, and end-of-run signal output means. The overchute feed mechanism is characterized by friction feed of the overchute sheets, actuated by an interruptable drive train under control of solenoid means maintained under steady state energization during a given overchute feed sequence, and by utilization of a single suction type sheet pickup means for both main sheet feed and overchute sheet feed.

In general the overchute feed mechanism comprises a supporting tray for the overchute sheets, intermittently driven feed rollers, a guide chute, a feed actuating solenoid including a sector cam to effect synchronized sheet feed, and secondary entry tabs which gravitationally ride the leading corners of the overchute sheet stack to facilitate separation of the top sheet from the stack. Upon feed of the leading edge of each overchute top sheet to a position where it is superimposed on the forward edge of the top sheet of the main stack, the pickup and feed thereof to the blanket drum of the printer is by the same vacuum pickup and feed roller components employed to pick up and feed catch each top sheet from the main stack.

BRIEF DESCRIPTION OF THE DRAWINGS

In the accompanying illustrations, wherein like letters and numerals refer to like parts:

FIG. 1 is a fragmentary view in top plan of a conventional offset duplicator type paper printing mechanism, equipped with an overchute feeder mechanism and control system according to the present invention;

FIG. 2 is a fragmentary view in side elevation of the duplicator and overchute feed mechanism shown in FIG. 1;

FIG. 3 is a fragmentary, side elevational view of the duplicator and overchute feeder mechanism shown at FIGS. 1 and 2, taken on a larger scale and showing various parts thereof at an instant of operation during feed of paper from the main stack of the duplicator, and with the feeding mechanism of the overchute feeder in non-operating condition;

FIG. 4 is a fragmentary view in side elevation, showing a portion of the equipment shown in FIG. 3, the illustration being of an instant of operation when the paper feed from the main stack is non-operating, and the paper feeding mechanism of the overchute feeder is operating;

FIG. 5 is an exploded isometric view on a further enlarged scale, showing additional detail of the overchute feeder paper feeding mechanism;

FIG. 6 is an enlarged isometric detail of the sheet separator tabs positioned at the forward corners of the auxiliary paper stack of the equipment shown at FIGS. 1–4;

FIGS. 7 and 7A are respective signal flow and ladder type electrical diagrams showing the control circuitry and associated components of a form of the invention not involving automatic feed sequence recycling;

FIGS. 8 and 8A are respective signal flow and ladder type electrical diagrams of the control circuitry and associated components of a modified form of the invention having an automatic feed sequence recycling capability, the showing of FIG. 8 being fragmentary to emphasize the differences between it and the FIG. 7 circuit; and FIG. 9 is a detail view in front elevation of a typical control panel for the equipment shown in FIGS. 1–6 and the control circuitry and electrical components shown in FIGS. 7, 7A and 8, 8A, and showing the counter dial and control switch layout thereof.

DESCRIPTION OF THE PREFERRED EMBODIMENTS

Figure 7:
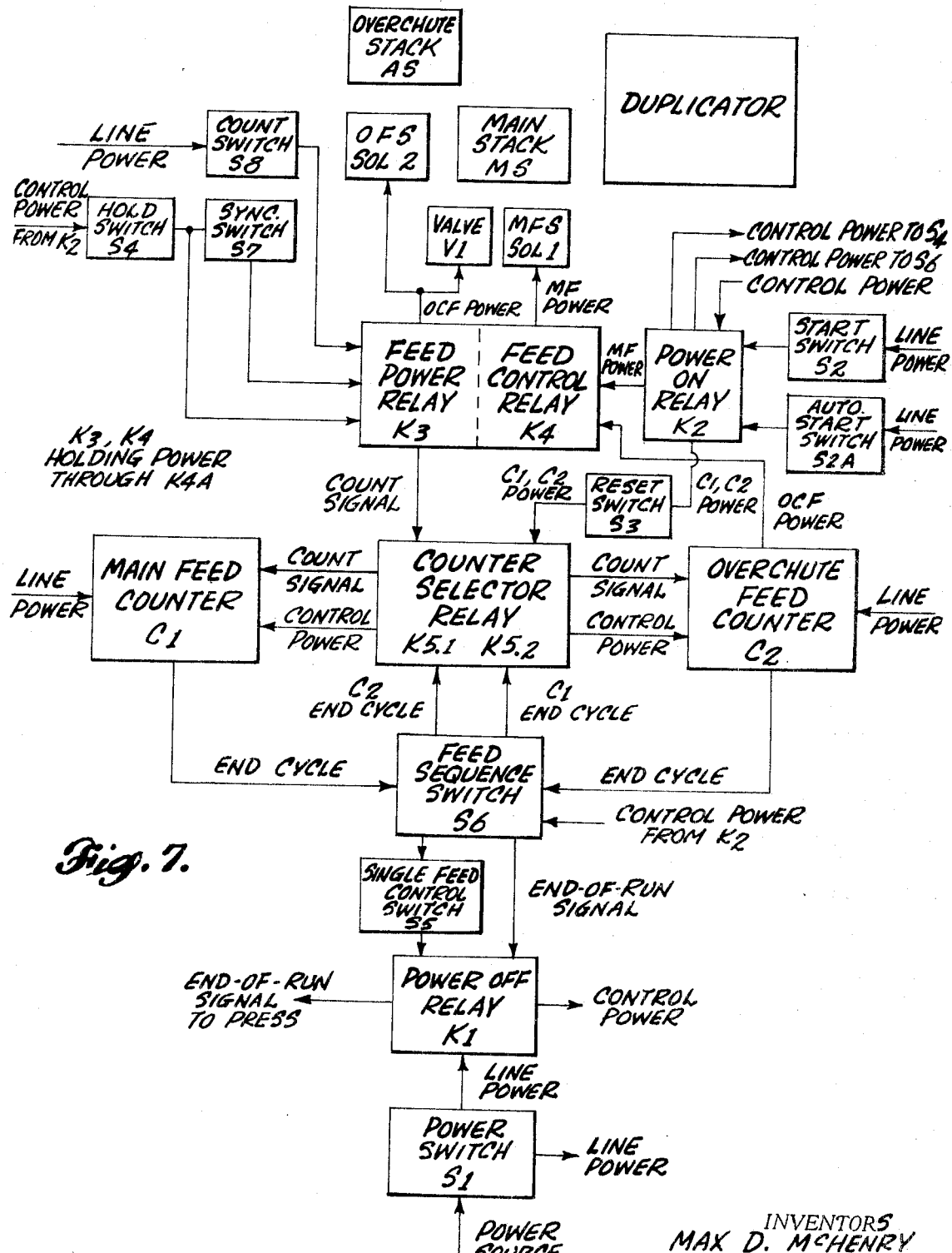

The duplicator type paper feeding and printing machine in part shown in FIGS. 1–3 is of a type conventional per se and serves simply to illustrate the type of conventional equipment to which the mechanism and control system of the present invention are applicable. Such duplicator mechanism are typified by the A. B. Dick Company Offset Duplicator Models 350, 360, 367A and 369, for example. The main paper feeding mechanism of such an equipment is commonly substantially as disclosed in more detail in Curtis U.S. Pat. No. 2,293,046, Curtis U.S. Pat. No. 2,358,560, and Janke U.S. Pat. No. 2,492,577, and reference can be had to these patents for more complete descriptions of the paper feed mechanism shown. To the extent here pertinent, such conventional paper feeding and printing mechanisms comprises a main frame 10, supporting glides (one of which is shown at 12), parallel upright side plates 14, 16, and laterally spaced upright channel members, one of which is shown at 18 in FIG. 2. Said channel members 18 receive the guide rollers (one of which is indicated at 20 in FIG. 2) of a vertically movable paper stack supporting platform 22 on which a stack of paper sheets rests, to be fed to the rotary blanket drum 24 of the duplicator. Such paper sheet stack is commonly called the main stack and is indicated in FIGS. 1–4 and 6 at MS. Blanket cylinder 24, also termed a blanket drum, is mounted on shaft 26, and operation of the paper feeding mechanism is synchronized with the rotation of the cylinder 24, as will be more fully discussed below.

Customary operation of the duplicator and associated main stack feeder mechanism involves progressive raising of the platform 22 to maintain the stack top main sheet, designated TMS, at nominally the same level and in proper position to be cyclically picked up near its forward edge by a plurality of laterally aligned vacuum cups (commonly referred to as a "suction foot"), which vacuum cups are collectively designated at 28 in FIGS. 1–3. The cups 28 oscillate on and are dependingly supported from a plurality of oscillating crank arms, one of which is shown at 30, with cyclic oscillation of the crank arms 30 (as indicated by the arrow designated 32 in FIG. 4) effecting a cyclic and progressive lowering of the vacuum cups 28 to engagement with the sheet TMS, then a lifting of the forward area of the top sheet TMS past paper height regulators 34, discussed in more detail below, thence through the arcuate path forwardly and upwardly toward and into the bight of driven feed rollers 36, 38, from which the leading edge of the top sheet TMS proceeds to engagement with holding clamp means on the impression cylinder (not shown) and proceeds through the duplicator.

As the top sheets TMS are progressively withdrawn from the main stack MS, the main stack paper feeding mechanism operates to elevate and maintain the stack MS at proper feed level. The mechanism by which this is done is a conventional portion of the duplicator paper feeding mechanism but is briefly described below for purposes of providing a ready understanding of the present invention. Main stack supporting platform 22 has connected thereto a lateral pair of chains 40 and counterweights 42. The chains 40 course respective sprockets 44 on shaft 46 which is manually rotatable by the operator through means of crank 48, and is subject to automatic leveling control effected through a ratchet 50 and pawl 52, the ratchet 50 being keyed to shaft 46. Pawl 52 coacts with ratchet 50 and is either cyclically oscillated or restrained by latch means (not shown), depending on the extent of vertical reciprocation of the paper height regulators 34. The regulators 34 undergo cyclic vertical throw (nominally a distance of about 3/16") in synchronism with rotation of drum 24 under action of driven cam means (not shown). When the top sheets TMS of the stack MS is at desired level, engagement of the lip portions 34' of the regulators 34 with the top sheet TMS interrupts the downward movement of the regulators 34 and disables the pawl 52, with the result that shaft 46 is not rotated and no elevation of the platform 22 occurs. However, when a given top sheet TMS is at lower than desired feed position, the regulators 34 move downwardly to a sufficient extent to unlatch the pawl 52 which thereupon indexes the ratchet 50, whereupon the ratchet steps the shaft 46 and raises the platform 22 until the pawl is again disabled.

Regulators 34 also comprise a vertically arranged array of air delivery holes 54 normally receiving air under pressure from pump means (not shown), the air delivery being through a Solenoid Valve VI and conduit means 56. During paper feed from the main stack MS the air delivered through holes 54 serves to slightly separate or "fluff" the forward edges of the uppermost sheets of the main stack MS, particularly the top sheet TS, and to thus facilitate rapid pickup of the top sheet TMS from the main stack MS. During sheet feed from the overchute feeder, as discussed below, this pressurized air feed is interrupted by actuation of the Solenoid Valve VI, which results in a slight dropping of the forward edge of the top sheet TMS, leaving a small gap between the top sheet TMS and the lips 34' of the regulators 34. It is into this gap that the forward edge of each sheet from the overchute feeder is fed, with its forward edge superimposed on the forward edge of the main stack top sheet TMS, in which position the auxiliary sheet is picked up and fed to the blanket drum 24 by vacuum cups 28 in the same manner as the top sheet TMS would be if the sheet from the overchute feeder were not thus interposed.

In its condition of energization of Solenoid Valve VI for overchute feed, the air from the pressure side of equipment pump (not shown) is led to atmosphere, preferably through an adjustable back pressure regulator (not shown) permitting selective, independently variable control of the extent of suction at the vacuum side of the pump and at the sheet pickup vacuum cups during overchute feed.

The overchute feeder mechanism, as typically shown at FIGS. 1–5, comprises an angularly disposed, auxiliary stack supporting tray 100, equipped with laterally adjustable side positioning guides 102, 104. The tray 100 is removably hooked to cross bar 106 and supported on a rearwardly placed, underslung support bracket 112 mounted to the side panels 108, 110. The sloped attitude of the tray 100 is selected to provide that the support surface 114 thereof is approximately aligned with the point of feed to which the auxiliary sheets are to be directed, i.e. the gap between the lips 34' or regulator 34 and the upper surface of the leading edge of the top sheet TS. Side positioning guides 102, 104 are in turn provided with rearwardly hinged separator arms 116, 118 which are configured forwardly (as best shown at FIG. 6 in the instance of arm 116) to have respective inwardly directed end panels 120, 122 extending below the level of the top auxiliary sheet TAS of auxiliary stack AS. The panels 120, 122 are respectively provided with small, rearwardly extending separator tabs 124, 126 which rest and "float" at the corners of the forward edges of the stack AS. As each top sheet TAS begins to move off the auxiliary stack AS, the tabs 124, 126 function to slightly buckle the areas of top sheet TAS around the tabs and to thus separate the forward area of the top sheet TAS from the next lower sheet of the auxiliary stack AS. Said tabs 124, 126 have been found to considerably improve reliability of the sheet feed from the auxiliary stack AS, and in this respect perform a function comparable to that of the air jets from holes 54 in the feeding mechanism for main stack MS. As will be apparent, the tabs 124, 126 simply rest gravitationally on the auxiliary stack AS and self-accommodate to any level of the top sheet TAS by reason of the hinged mounting of the arms 116, 118 on the respective side panels 102, 104.

As best shown in FIGS. 1 and 5, the feed mechanism by which auxiliary sheets are fed from auxiliary stack AS comprises a laterally spaced, laterally adjustable pair of feed rollers 130, 132 of the type conventional per se, which are keyed to laterally extending roller feed drive shaft 134. Drive shaft 134 is provided at one end with a one-way clutch 136 which drives the shaft 134 in the direction of feed (counterclockwise, as viewed in FIG. 5), and which disengages the shaft 134 for relative movement in the other direction (clockwise, as viewed in FIG. 5). Feed roller drive shaft 134 is journalled on arms 138, 140, which are also connected together by the cross arm 106, with the arms 138, 140 being respectively journalled to the side panel 108 and to an upstanding trunnion 144 on the tray mounting bracket 112. A handle 146 is provided in opposed relation to the arm 140 to facilitate manual raising of the rollers 130, 132, such as when the supply of paper sheets making up the auxiliary stack AS is to be replenished.

Paper feeding drive of the rollers 130, 132 is derived from blanket cylinder shaft 26 through a drive chain and drive train comprising sprocket 150, chain 152, sprocket 154, shaft 156 and sector cam 158 keyed thereto, and thence intermittently through the rubber faced idler roller 160 and the metal roller 162 keyed to shaft 164 which in turn drives sprocket 166 and chain 168 as well as sprocket 170 to which the clutch 138 and roller drive shaft 134 are connected. This drive train is operative or non-operative depending upon the position of rubber idler roller 160 relative to roller 162, which is in turn determined by the energization conditions of Overchute Feed Solenoid SOL2, the idler roller 160 being journalled for rotation at one end of arms 170, 172, which are in turn centrally supported on bearings coaxial with shaft 156, and which are connected at the end opposite to the rubber roller 160 to the armature 174 of Overchute Feed Solenoid SOL2, such connection being in the form of a pivotally adjustable bracket 176 and a tension spring 177. Spring 177 permits slight pivotal movement of the arms 170, 172 and the roller 160 when the solenoid SOL2 is in energized condition, which slight pivotal movement is desirable to ensure positive contact between the rollers 160, 162.

A spring loaded brake mechanism is journalled on shaft 156 and comprises bracket 178 which is pivotally moved by pin 179 on arm 172 to engage rubber bumper 178' with driven roller 162 when drive roller 160 is disengaged from the roller 162 and thus prevent over-run of the paper engaging feed rollers 130, 132.

The outer end of cam drive shaft 156 is rotatably supported by an upright outer panel 180 mounted on a plurality of support rods 182 standing out from panel 16 of the main frame 10. This panel 180 also carries an idler sprocket 184 and spring loading arm 186 therefor, which idler sprocket 184 serves to maintain the drive chain 150 taut. Also mounted on the panel 180 are Synchronizing Switch S7 and Unit Count Switch S8. Normally open microswitch S7 (cf. FIGS. 7–8A) is cyclically closed by sector cam 188 on shaft 156, and functions to delay energization of the solenoid SOL2 until the beginning of the next printing sequence of the drum 24 in the event overchute energization occurs at a moment when a feed cycle is already started. A second, normally open microswitch S8, termed the Unit Count Switch, is actuated by a second small cam 190, on shaft 156 and serves simply to provide a sheet count signal to each feed cycle.

As a given top auxiliary sheet TAS is fed off the auxiliary stack AS it is suitably guided into the desired pickup position with its leading edge under the regulator lips 34' (FIG. 4). In the typical overchute mechanism shown, this guiding function is performed by a guide chute mounted at the forward end of the tray 100 and comprising respective converging upper and lower panels 190, 192, configured to channel the said sheet TAS into the desired pickup position, as designated by arrow 194 (again note FIG. 4). The lower edge of lower panel 192 is provided with a laterally extending bead 196 resting on the top sheet of main stack MS, which takes the place of and functions in like manner as the conventional holddown bale.

A principal advantage of the overchute feeding mechanism paper feed drive is that the drive is rendered operative or non-operative simply by steady state energization or deenergization of the Overchute Feed Solenoid SOL2, with cyclic feed of sheets from the overchute feeder continuing as long as solenoid SOL2 is maintained in energized condition. This mode of actuation of the overchute feeder is to be contrasted with certain prior overchute feed mechanisms wherein an electrical control component such as a solenoid is energized each time an auxiliary sheet is fed to the printer.

FIGS. 7 and 7A present one form of control system for the duplicator and paper feeding mechanisms shown at FIGS. 1–6. This circuit is designed to provide full flexibility as to whether the paper feed is from the main stack MS first, or the auxiliary stack AS first, with a preset number of sheets being fed from each stack, and with automatic shutdown at the end of one feed cycle, i.e. after the selected number of sheets are fed from each stack in the desired sequence. The circuit of FIGS. 7, 7A is not designed to have a so-called recycle capability, i.e. to automatically recycle for a predetermined number of repetitions of main feed and auxiliary feed sequences; however the circuit shown in FIGS. 8, 8A does have such recycle capability.

In the control system shown at FIGS. 7 and 7A, two presettable countdown type counter mechanisms are employed, a Main Feed Counter C1 and an Overchute Feed Counter C2. Main Feed Counter C1 can be of a type conventional per se, such as Eagle Signal Microflex reset counter Model No. HZ40, and Overchute Feed Counter C2 is suitably a conventional presettable countdown counter such as Eagle Signal Cycl-Flex Counter Model HZ170.

Figure 8A:
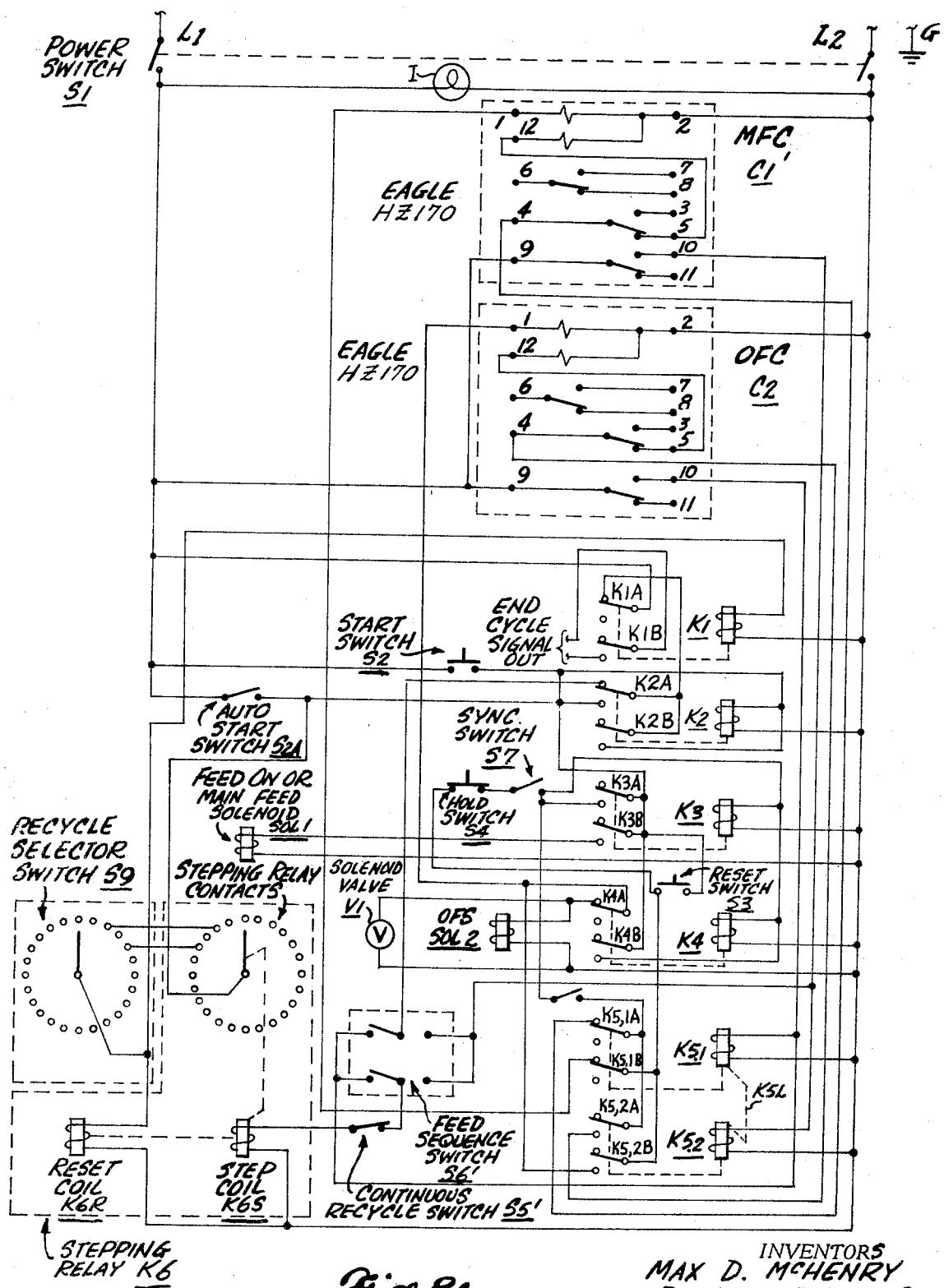

Each of the feed counters C1, C2, as known per se, has three operating modes; a reset condition, a counting condition, and a count out or "end cycle" condition. In FIGS. 7A and 8A, the manufacturer's terminal numbering has been adopted in the showing of the Eagle Counter HZ40 and the Eagle Counter HZ170.

Other principal components of the control system shown at FIGS. 7 and 7A are as follows:

Power Relay K1—with normally closed power interrupt contacts K1A and normally open contacts K1B used to provide an end-of-run signal output for shutdown of the duplicator at the end of a given printing run.

Power on Relay K2—with power supply contacts K2A and normally open interlock contacts K2B.

Feed Power Relay K3—with normally open overchute solenoid power supply contacts K3A and normally open main feed solenoid power supply contacts K3B.

Feed Control Relay K4—with normally open contacts K4A for both relay K3 and relay K4, and with normally open contacts K4B supplying power to Unit Count Switch S8.

Counter Selector Relay K5.1, K5.2—suitably a general purpose electro-mechanical dual latcher relay such as E. W. Bliss Company Model 25BL, comprised of two relays K5.1 and K5.2 mechanically interlatched as indicated at FIG. 7 at K5L, the relay K5.1 operating normally open contacts K5.1A in the counter C1 count power supply, and normally open contacts K5.1B in the counter C1 clutch power supply, and relay K5.2 having normally closed contacts K5.2A in the counter C2 count power supply and normally closed contacts K5.2B in the counter C2 clutch power supply.

Feed On or Main Feed Solenoid SOL1—the conventional control solenoid for operation of the main feed mechanism of the duplicator.

Overchute Feed Solenoid SOL2—as shown at FIGS. 3–5, for example.

Solenoid Valve V1—is the air supply to main stack height regulator 34, as shown in FIG. 2.

Power Switch S1—a manual, double pole single throw switch in power lines L1, L2 (suitably provided with electrical power at 120 volts 60 cycles, for example).

Start Switch S2—a manual, momentary or single pole, single throw switch.

Auto Switch S2A—a normally open single pole, single throw switch.

Reset Switch S3—a manual, momentary open type switch.

Hold Switch S4—of the manual, normally closed type.

Single Feed Control Switch S5—of the single pole double throw (center off) type.

Feed Sequence Switch S6—a manual, triple pole double throw switch determining whether main feed or overchute feed occurs first during a given cycle or printing run, and shown at FIG. 7 in its main feed first (Counter C1) position.

Synchronizing Switch S7—a normally open limit switch, as shown in FIG. 5.

Unit Count Switch S8—a normally open limit switch, as shown in FIG. 5.

FIG. 7 is a signal flow diagram presenting the operating sequence of the circuit schematically shown in FIG. 7A.

Line power from a suitable source (120 volt 60 cycle single phase) from lines L1, L2 is applied to Power Switch S1. Closure of Power Switch S1 delivers line power to a power indicator light I, to Power Off Relay K1, Start Switch S2, Auto Switch S2A, to Main Feed Counter C1 and Overchute Feed Counter C2, to Count Switch S8, and to Hold Switch S4. Power Off Relay K1 remains deenergized during an operating cycle, and in effect provides dual functions of delivering control power via its normally closed contacts K1A to Power On Relay K2, and to interrupt the control power at the end of a given printing run, at which time the Power Off Relay K1 is energized by an end-of-run signal from Feed Sequence Switch S6, which energization opens the contacts K1A and closes contacts K1B to deliver an end-of-run signal output to the duplicator.

A control power output via contact K1A of relay K1 also is passed by double throw contact K2A of Power On Relay K2, the contacts K2A in the deenergized condition providing a control power input to Feed Sequence Switch S6 which, by its manual setting preliminary to closure of the switch S2, determines the initial condition of Counter Selector Relays K5.1, K5.2, i.e. establishes which of the counters C1, C2 will count first. With the desired feed sequence thus established, Start Switch S2 is closed, delivering line power to energize Power On Relay K2, whereupon contacts K2A thereof open the control power circuit to the Feed Sequence Switch S6 and deliver control power to the Counter Selector Relay K5.1, K5.2 through Reset Switch S3. Contacts K2A also deliver control power to the pole of contacts K3B of Feed Power Relay K3. Contacts K2B of power on relay K2 simply perform an interlocking function for the relay K2. The Counter Selector Relay K5.1, K5.2 provides control power to the clutch coil of either counter C1 or counter C2, depending on which is to count first as determined by the Feed Sequence Switch S6.

Auto Switch S2A provides the same initial energization for Power On Relay K2 as does manual Start Switch S2 but is used only in duplicator equipments which are equipped to automatically restart after automatic wash up (as in the A. B. Dick Company Model 367A) or to restart after automatic master reloading and automatic wash up (as in the A. B. Dick Company Model 369).

The line power input to Feed Power Relay K3 is delivered through manual Hold Switch S4 and Synchronization Switch S7. The function of Hold Switch S4 is to provide means to manually interrupt the feed and count of either main feed or overchute feed for inspection or correction during a given printing run, and the function of Synchronization Switch S7 is to assure, when feeding off the overchute feeder auxiliary stack AS, that each overchute sheet receives a full cycle of friction feed from rollers 130, 132. The Synchronizing Switch S7 is synchronized with the sector cam 158 in the overchute feed drive mechanism by the small sector cam 188 on the common shaft 156 with said sector cam 158.

Line power is also delivered to Feed Control Relay K4 by normally open Count Switch S8. Feed power Relay K3 and Feed Control relay K4 are energized in parallel through normally closed Hold Switch S4 and upon initial closure of synchronizing Switch S7, presuming control power delivery from contacts K2A of energized relay K2. Contacts K4A provide interlock for both relay K3 and K4. Normally open contact K3A delivers overchute feed power to Overchute Feed Solenoid SOL2 and energizes Solenoid Valve V1 in the situation where overchute feed power is delivered to said contacts K3A from Overchute Feed Counter C2 (terminal 1). Main feed power from energized contact K2A is delivered through energized contacts K3B to the Feed On Solenoid SOL1. Closure of normally open contacts K4B upon energization of relay K4 delivers the count signal from Count Switch S8 to Counter Selector Relay K5.1, K5.2 (through contacts K5.1A or contacts K5.2A) and to the count coil of counter C1 (terminal M) or the count coil of counter C2 (terminal 12).

A count signal (closure of count switch S8) occurs each time a sheet is fed through the duplicator. As notable in FIGS. 1 and 5, cam 190 is synchronously driven with cylinder 24 through sprocket 26, chain 152 and sprocket 154, so a count signal occurs whether the sheet feed is from main stack MS or the auxiliary stack AS.

When the selected counter receives a number of count signals equal to the preset number in the counter, the counter generates an end cycle signal which is delivered to the Counter Selector Relay K5.1, K5.2 through Switch S6 and this relay functions to shift the control power input from relay K2 and the count signal input from relay K4 to the other feed counter, and also to open the control power circuit to the counter first activated, which power interruption serves to reset the counter to its initial, preset condition. Energization of the second feed counter involves no change in operating condition of the relays K3, K4. Main Feed Solenoid SOL1 remains energized continuously during the printing run and the condition of energization of the Overchute Feed Solenoid SOL2 and Solenoid Valve V1 is determined by whether overchute feed power is available at counter C2, terminal 1.

Assuming a given run involves feed from both the main stack MS and the overchute stack AS, and assuming the initial feed sequence is completed and the Counter Selector Relay K5.1, K5.2 has shifted the count signal and control power to the second counter, the sheet feed and unit count then continue until the second counter generates an end cycle signal (terminal 1 of counter C1 or terminal 10 of counter C2), whereupon the end cycle signal is directed through Feed Sequence Switch S6 to the relay K5.1, K5.2 and to the Power Off Relay K1. This second end cycle signal constitutes an end-of-run signal in the circuit shown at FIGS. 7, 7A (since this circuit has no recycle capability) and is passed as an end-of-run signal to Power Off Relay K1 where it energizes the relay and charges condenser C3. Energization of the relay K1 opens contacts K1A which interrupt the control power supply circuit to relay K2, deenergizing it and relays K2, K3 and K4, and resetting the Counter Selector Relays K5.1, K5.2 to its initial condition through contacts K2A and switch S6. The purpose of condenser C3 is to maintain energization of the relay K1 for a sufficient time after interruption of control power (opening of the relay contacts K1A) to enable momentary closure of contacts K1B.

A single feed operating mode is provided in the circuit shown at FIGS. 7, 7A, by Single Feed Control Switch S5 which is a single pole double throw switch with a neutral center position. In the center position of this switch, the circuit proceeds through successive counts on both counters C1, C2 in the order determined by Feed Sequence Switch S6. In the down position of switch S5 the circuit proceeds through a counter C1 sequence (i.e. main feed only) and the control switch S5 transmits the end cycle signal from Main Feed Counter C1 to the power off relay K1 as the end-of-run signal. In the up position of Single Feed Control Switch S5, only the feed counter C2 operates (i.e. overchute feed), and the control Switch S5 directs the end cycle signal from counter C2 to the relay K1 as the end-of-run signal.

FIGS. 8 and 8A present a modified form of control circuitry for practice of the present invention, which circuitry has an automatic recycling capability as well as an automatic feed mode sequencing capability. Each feed sequence can involve either main feed or overchute feed occurring first, or can involve a series of feed sequences from either the main stack or the overchute stack by the setting of the other counter to zero, with a preset number of feed sequences, i.e. a predetermined number of recycles, occurring before end-of-run shutdown. In a typical specific circuit, as described below, the system has a recycling capability for as many as 20 recycles before automatic shutdown, or can be placed in a continuous recycle mode, with each automatically recurring feed mode sequence being presettable from 1 to 100 units or sheets per sequence.

The signal flow, diagrammatic showing presented at FIG. 8 is fragmentary in nature to emphasize the changes therein as compared with the signal flow diagram of FIG. 7, and it will be understood that the FIG. 8 circuitry operates in conjunction with the other circuit components not shown in FIG. 8 but shown in the upper portion of FIG. 7, namely those circuit components appearing above the counters C1, C2 and the Counter Selector Relay K5.1, K5.2 in FIG. 7. As will also be apparent, the FIGS. 8, 8A circuit operates in the same manner as the FIGS. 7, 7A circuit except as otherwise described.

In adapting the control circuit for automatic recycling, the single feed control switch S5 is replaced by a Continuous Recycle Switch S5', a single pole single throw switch which is maintained in open condition for continuous recycling and is maintained closed when it is desired to have automatic shutdown after a predetermined number of recycles. Feed Sequence Switch S6' replaces Feed Sequence Switch S6 and is a double pole double throw manual switch determining which of the feed counters C1', C2 proceeds first. In this modified control circuit, as shown at FIGS. 8, 8A, both of the counters C1', C2 are typically Eagle Signal Model HZ170 Cyclflex counters. Added to the control circuit components are a Stepping Relay K6, typically a Guardian Electric Model NER115, 21 position, electrical stepping relay with integral reset, incorporating a step coil K6S and mechanically ganged reset coil K6R, the step coil K6S functioning to step a 21 position switch, designated as stepping relay contacts in FIG. 8. Stepping Relay K6 is cross wired with a Recycle Selector Switch S9, a conventional 21 position wafer type switch, presettable to a selected contact condition wherein in a given stationary contact is in circuit with a movable pole contact on the Stepping Relay K6. For simplicity, only two of the various cross wiring connections between the stepping relay contacts and the switch S9 contacts are shown in FIG. 8.

During operation of the FIGS. 8, 8A control circuit, and as a given counter C1' or C2 generates an end cycle signal to the Feed Sequence Switch 6S', the end cycle signal proceeds from the switch 6S' to effect change in feed mode by the action of relay K5.1, K5.2 switching from one counter to the other, and also delivers the end cycle signal through the closed Continuous Recycle Switch S5' (assuming continuous recycle mode has not been selected) to the step coil K6S of stepping relay K6. Assuming the desired number of recycles preset on Recycle Selector Switch S9 has not yet been attained, actuation of the step coil K6S simply indexes to the next stepping relay contact. As long as the end-of-cycle signal reaching reset coil K6S does not cause the indexing of the movable pole of the stepping relay to a contact in electrical circuit with the movable pole of the Recycle Selector Switch S9, no end-of-run signal output occurs from the Recycle Selector Switch 9. However, when a sufficient number of recycles and consequent step coil K6S energizations has occurred so that the movable pole of stepping relay K6 is in electrical circuit with the movable pole of switch S9, then an end-of-run signal is delivered to energize Power Off Relay K1 and to energize reset coil K6R of Stepping Relay K6 to return the movable pole of the Stepping Relay K6 to its initial position. Delivery of the end-of-run signal to Power Off Relay K1 causes interruption of the control power and generation of an end-of-run signal output to the press in like manner as occurs in the FIGS. 7, 7A circuit.

With the Continuous Recycle Switch S5' in open position, no end-of-cycle signal is sent to the Stepping Relay K6 and therefore counters C1' and C2 continue to sequentially recycle indefinitely or until manual interruption of power by opening of power switch S1.

One operating mode of special interest is the situation, utilizing the FIGS. 8, 8A control circuit with each feed counter C1', C2 set to count a single sheet and with the Continuous Recycle Switch S5$_2$ in open position. In this mode, sheet feed occurs one from the main stack MS and one from the auxiliary stack AS in alternating sequence, and continues without automatic interruption. This mode of operation, involving the collating of single sheets from separate stacks, offers limitless variety in terms of interleaving different sheet stocks with single runs or multiple reruns of paper through the printer.

FIG. 9 illustrates a typical control console housing either of the control systems shown at FIGS. 7, 7A and FIGS. 8, 8A. As shown in FIG. 9, a front elevational view of the control panel, the counters C1 (or C1') and C2.

each with preset manual pointers and count responsive pointers, are mounted in the upper portion of the panel, with power indicator light I and Recycle Selector Switch S9 (when used) arranged between the counters. Below the counters is the bank of manual control switches, the order of which in a typical arrangement is Power Switch S1, Start Switch S2, Reset Switch S3, Hold Switch S4, Single Feed Control Switch S5 (in the FIGS. 7, 7A circuit) or Continuous Recycle Switch S5' (in the FIGS. 8, 8A circuit), and Feed Sequence Switch S (in FIGS. 7, 7A) or Feed Sequence Switch S' (in FIGS. 8, 8A).

As will be evident, modifications and adaptations of the mechanism and control circuitry shown may be made consistent with the novel characteristics of the invention. Thus, simply by way of further example, the sequencing and recycle control system disclosed can be used with a variety of overchute feeder mechanisms and the overchute feed mechanism disclosed can be used with other control circuitry. Also, with regard to overchute feeder mechanism detail, it will be apparent that the friction feed of the overchute feeder could be supplanted by a vacuum feed system or other suitable system to effect transfer of the auxiliary sheets TAS from the auxiliary stack AS to the point of pickup thereof by the main feed pickup system, if desired. In addition, the chain drive system including chain 152 for the overchute feeder can have substituted therefor a synchronous motor drive, or other synchronized drive means, in a manner known per se. As a further variation of the mechanism disclosed, it will be understood that a given printing equipment can be equipped with a plurality of overchute feeder mechanisms, either one above the other in stationary positions or moved horizontally into and out of printer infeed position, on a selectively controlled basis. In such plural overchute assembly arrangement, each overchute sheet storage and feed mechanism comprises its own selectively controllable paper feed components feeding auxiliary sheets into either a common or separate guide chutes or the like, and selectively delivering the auxiliary sheets automatically from each auxiliary paper source to a position with the leading edge thereof superimposed on the leading edge of the main stack top sheets TMS. Various further modifications and adaptations will be apparent to those skilled in the art to which the invention is addressed, within the scope of the following claims.

What is claimed is:

1. In a duplicator type paper printing mechanism having a rotary blanket cylinder, a main paper feeding mechanism comprising main paper feeding means maintaining a main stack of paper sheets with the top sheet at substantially a predetermined feed level, and top sheet pickup means synchronously picking up and feeding the leading edge of the top sheet of the main stack into the nip of driven feed rolls and into retained position for engagement with the rotary blanket cylinder of the printing mechanism; an overchute paper feeding mechanism comprising:
   (a) tray means disposed generally above the main paper sheet stack;
   (b) top overchute sheet feed means;
   (c) paper guiding means forwardly of said overchute feed means and directing the leading edge of the fed sheet into engaged and substantially superimposed position with the leading edge of the top sheet of the main stack;
   (d) interruptable drive train means for said overchute sheet feed means, including power operable means for activating the overchute sheet feed means when energized and inactivating such feed means when deenergized;
   (e) sheet count means counting each sheet fed to the printing mechanism;
   (f) a first feed counter associated with one paper feed mechanism and a second feed counter associated with the other paper feed mechanism;
   (g) feed sequence selection means establishing either one or the other of the feed counters as first activated;
   (h) end cycle signal generation means in each counter;
   (i) means responsive to an end cycle signal from either such counter to deactivate such counter, one such feed counter when activated generating a power signal throughout its count cycle; and
   (j) means responsive to the feed counter generated power signal to energize the said power operable means in the overchute sheet feed means.

2. Mechanism according to claim 1, comprising power interrupt means responsive to an end cycle signal generated by one of the feed counters and operating to interrupt power energization of both feed counters.

3. Mechanism according to claim 1, further comprising recycle control means responsive to the end cycle signal generated by one of the feed counters and operating to deactivate and reset such feed counter and to reactivate the other feed counter.

4. Mechanism according to claim 3, comprising continuous recycle control means providing a mode of operation characterized by alternate reactivation of the feed counters indefinitely.

5. Mechanism according to claim 3, comprising continuous recycle control means alternately collating a single sheet from each of the stacks of sheets.

6. Mechanism according to claim 3, further comprising preset recycle selector means, and means responsive to end cycle signals from the feed counter means and generating an end-of-run signal after a preset number of feed counter means reactivations, and power interrupt control means responsive to such end-of-run signal and functioning to deenergize both said feed counter means.

7. Mechanism according to claim 1, synchronizing switch means in the drive train for overchute sheet feed means and delaying energization of the overchute feed means in the event the main sheet feed means is in mid-cycle at the moment of actuation of the overchute feed counter.

8. Mechanism according to claim 1, comprising reset switch means in control power circuits for the feed counter means, actuation of which resets the activated feed counter to the beginning of its count cycle regardless of the count condition existing therein in response to count signals from said sheet counting means.

9. Mechanism according to claim 1, comprising single feed control switch means in circuit with an end cycle signal output from either feed counter and transmitting an end-of-run signal to said power interrupt means on the occurrence of an end cycle signal from the activated feed counter.

10. Mechanism according to claim 1, comprising manual hold switch means interrupting feed counter activation without reset of the feed counter.

11. Mechanism according to claim 1, wherein said overchute feed mechanism comprises an overchute stack supporting tray, top sheet feed roller means pivotally supported above said tray, and sheet guide means disposed forwardly of said tray, said tray and sheet guide means being oriented to direct a fed sheet to a position with the leading edge thereof substantially superimposed on the leading edge of the main stack top sheet.

12. Mechanism according to claim 1, wherein the main paper feeding means comprises a solenoid energized during both feeding of sheets from the main stack and feeding of sheets from the overchute stack.

13. Mechanism according to claim 1, wherein the overchute feed means comprises solenoid means operable to engage or disengage overchute feed drive train components.

14. Mechanism according to claim 13, wherein the overchute feed drive train comprises a continuously driven shaft driven in synchronism with the blanket drum of the duplicator mechanism, a sector cam on said drive shaft, movable drive roller means intermittently driven by said sector cam and movable responsive to energization of said overchute feed solenoid means, driven roller means engaged by said movable drive roller upon energization of said solenoid means, and one-way overchute sheet feed means driven by said driven roller means.

15. Mechanism according to claim 14, wherein said movable driver roller is mounted on arm means journalled for pivotal movement on the sector cam drive shaft and said drive shaft also mounts for pivotal movement thereon a spring loaded brake mechanism including a friction element engaging the said driven roller responsive to movement of said movable drive roller out of engagement with said latter driven roller, and disengageable from said latter driven roller upon movement of the said driving roller into engagement with the driven roller.

16. In an automated duplicator type printing mechanism and the the like having a main sheet stack and an auxiliary sheet stack with a sheet pickup means for the main stack and for the auxiliary stack, including power means for actuating sheet feed from the main stack, and including interruptable power means for actuating sheet feed from the auxiliary stack, such latter power means upon actuation positioning the leading edge of each top sheet from the auxiliary stack in the same position as is occupied by the leading edge of the main stack top sheet when the main stack top sheet is being picked up by said sheet pickup means; a control system for said power means, comprising:

(a) a main feed counter;
(b) an auxiliary feed counter;
(c) counter sequence determining means;
(d) means sensing the count of sheets fed to the duplicator mechanism and delivering such count to one or the other of said feed counters;
(e) means in each of said counters developing an end cycle signal upon the occurrence of a predetermined number of counts therein;
(f) means responsive to an end cycle signal for resetting the first selected counter and actuating the second selected counter upon occurrence of such end cycle signal in the first feed counter;
(g) means in said second feed counter generating at an end cycle signal upon occurrence of a preset number of counts in said second counter; and
(h) power interrupt means responsive to an end cycle signal from one of the counters to interrupt the paper feed, said first feed counter operating to establish the number of sheets fed to the printing mechanism from one of the sheet stacks, and the second such feed counter operating to establish the number of sheets fed to the printing mechanism from the other stack of sheets.

17. A duplicator mechanism according to claim 16, comprising power interrupt means responsive to the end cycle signal generated by the feed counter secondly activated and operating to interrupt power energization of both feed counters.

18. A duplicator mechanism according to claim 16, further comprising recycle control means responsive to the end cycle signal generated by one of the feed counters and operating to deactivate and reset such feed counter and to reactivate the other feed counter.

19. A duplicator mechanism according to claim 18, comprising continuous recycle control means providing a mode of operation characterized by alternate reactivation of the feed counters indefinitely.

20. A duplicator mechanism according to claim 18, comprising continuous recycle control means alternately collating a single sheet from each of the stacks of sheets.

21. A duplicator mechanism according to claim 18, further comprising reset recycle selector means, and means responsive to end cycle signals from the feed counter means and generating an end-of-run signal after a preset number of feed counter means reactivations, and power interrupt control means responsive to such end-of-run signal and functioning to deenergize both said feed counter means.

22. In a duplicator mechanism according to claim 16, synchronizing switch means in the drive train for auxiliary sheet feed means and delaying energization of the auxiliary sheet feed means in the event the main sheet means is in mid-cycle at the moment of actuation of the auxiliary feed counter.

23. A duplicator mechanism according to claim 16, comprising reset switch means in control power circuits for the feed counter means, actuation of which resets the activated feed counter to the beginning of its count cycle regardless of the count condition existing therein in response to count signals from the sheet counting means.

24. A duplicator mechanism according to claim 16, comprising single feed control switch means in circuit with an end cycle signal output from either feed counter and transmitting and end-of-run signal to said power interrupt means on the occurrence of an end cycle signal from the activated feed counter.

25. A duplicator mechanism according to claim 16, comprising manual hold switch means interrupting feed counter activation without reset of the feed counter.

26. A duplicator mechanism according to claim 16, wherein said auxiliary sheet feed mechanism comprises an auxiliary stack supporting tray, top sheet feed roller means pivotally supported above said tray, and sheet guide means disposed forwardly of said tray, said tray and sheet guide means being oriented to direct a fed sheet to a position with the leading edge thereof substantially superimposed on the leading edge of the main stack top sheet.

27. A duplicator mechanism according to claim 16, wherein the main paper feeding means comprises a solenoid energized during both feeding of sheets from the main stack and feeding of sheets from the auxiliary stack.

28. A duplicator mechanism according to claim 16, wherein the main sheet feed means comprises solenoid means operable to engage or disengage auxiliary sheet feed drive train components.

29. A duplicator mechanism according to claim 28, wherein the auxiliary sheet feed drive train comprises a continuously driven shaft driven in synchronism with a continuously driven shaft of the duplicator mechanism, a sector cam on the first said shaft, movable drive roller means intermittently driven by said sector cam and movable responsive to energization of said solenoid means, driven roller means engaged by said movable drive roller upon energization of said solenoid means, and one-way auxiliary sheet feed means driven by said driven roller means.

30. A duplicator mechanism according to claim 29, wherein said movable driver roller is mounted on arm means journalled for pivotal movement on the sector cam drive shaft and said drive shaft also mounts for pivotal movement thereon a spring loaded brake mechanism including a friction element engaging the said driven roller responsive to movement of said movable drive roller out of engagement with said latter driven roller, and disengageable from said latter driven roller upon movement of the said driving roller into engagement with the driven roller.

31. In combination with a duplicator type paper printing mechanism having a rotary blanket cylinder, a main paper feeding mechanism comprising main paper feeding means maintaining a main stack of paper sheets with the uppermost sheet at a predetermined feed level, and oscillated vacuum cup pickup means functioning to synchronously pick up the leading edge of the top sheet on the main stack and to feed the picked up sheet into the nip of driven feed rolls and into retained position for printing engagement with said rotary blanket cylinder; an overchute paper feeding mechanism comprising:
(a) supporting tray means for an auxiliary stack of paper sheets;
(b) feed roller means resting on the top sheet of the auxiliary stack of paper sheets;
(c) paper guiding means forwardly of said feed roller means and oriented to direct the leading edge of the top auxiliary sheet under said vacuum cup pickup means and into engaged and substantially superimposed position with the leading edge of the top sheet of the main stack of paper sheets when such top auxiliary sheet is fed forwardly by said feed roller means;
(d) drive train means for said feed roller means, including a sector cam and disengageable rotary means;
(e) feed mode control means comprising first solenoid means for operating the main paper feed from said main stack, and second solenoid means for operating the auxiliary paper feed from the overchute feeder; and
(f) electrical control means for automatically energizing said second solenoid means to feed a predetermined number of overchute sheets into position to each be picked up by the main paper feeding means and fed to the paper printing mechanism.

References Cited

UNITED STATES PATENTS

| | | | |
|---|---|---|---|
| 2,492,577 | 12/1949 | Janke | 271—9 |
| 3,175,821 | 3/1965 | Gibson | 271—9 X |
| 3,273,883 | 9/1966 | Baronnie | 271—9 |
| 3,348,464 | 10/1967 | Sturdevant | 271—9 X |
| 3,415,510 | 12/1968 | Mileski | 271—9 X |

ROBERT E. PULFREY, Primary Examiner

J. R. FISHER, Assistant Examiner

U.S. Cl. X.R.

271—9